Dec. 22, 1959 B. L. NIKKEL 2,917,993
BALER
Filed May 18, 1954 5 Sheets-Sheet 1
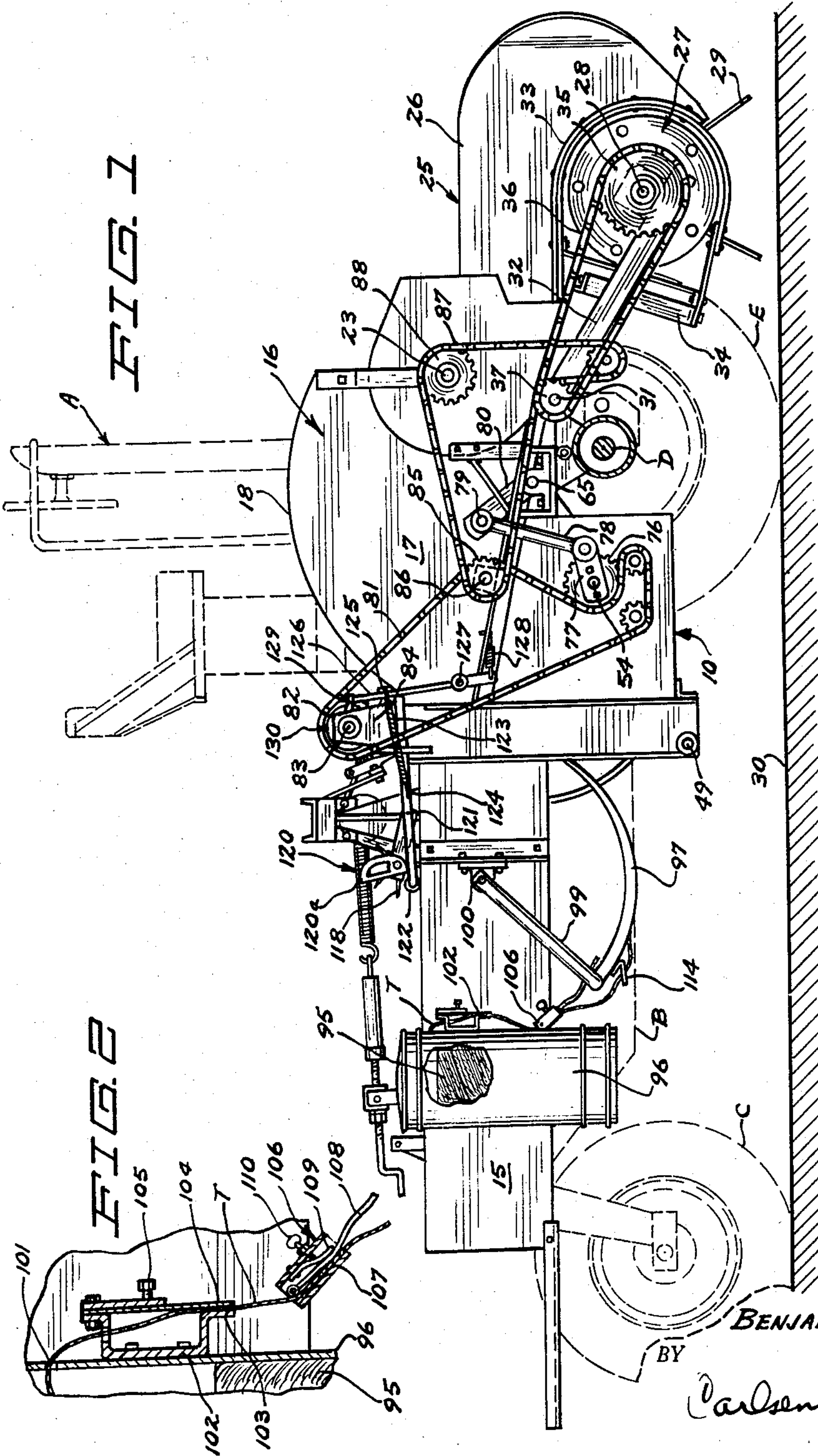
INVENTOR.
BENJAMIN L. NIKKEL
BY
Carlsen & Hagle
ATTORNEYS BALER
Filed May 18, 1954 5 Sheets-Sheet 2
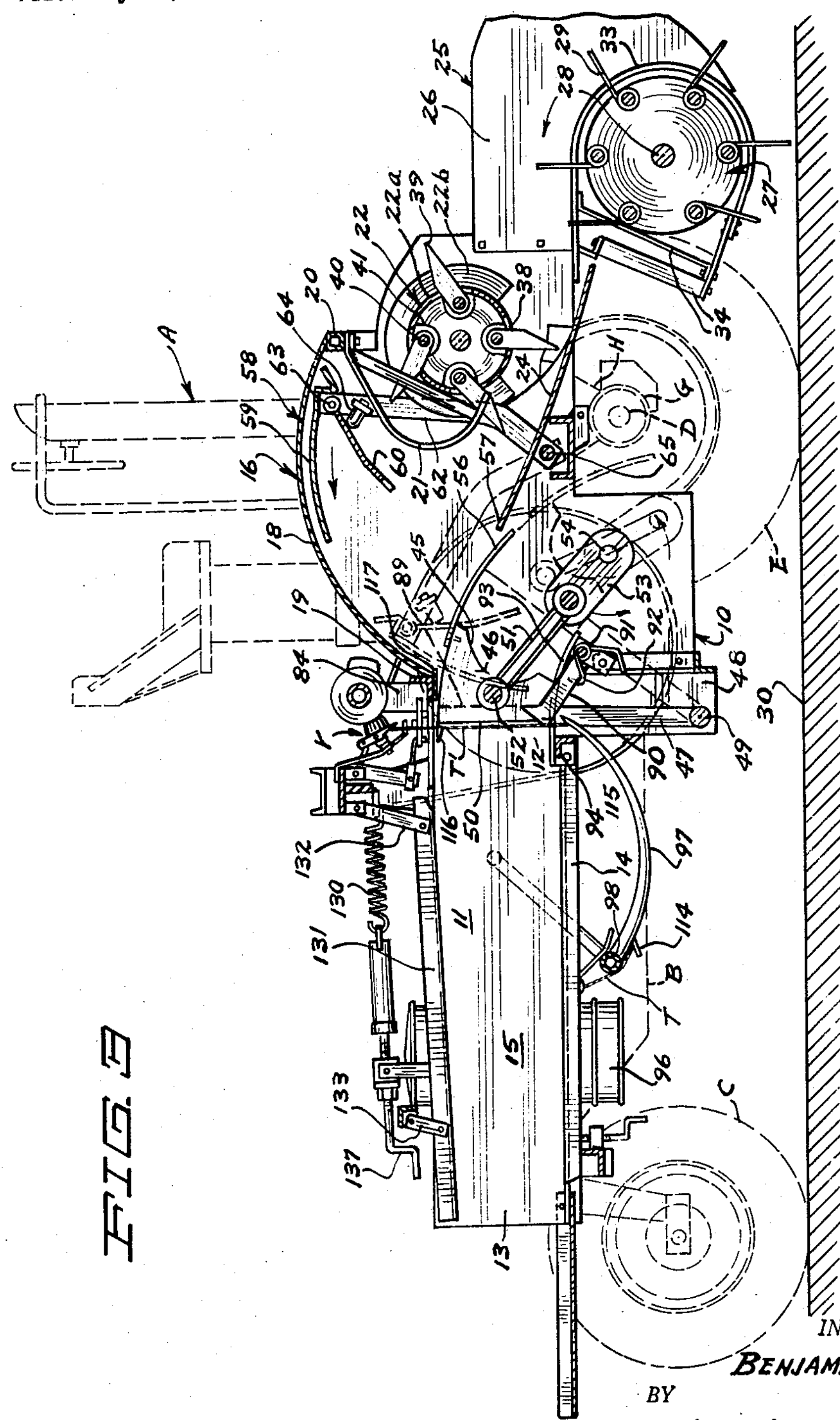
INVENTOR.
BENJAMIN L. NIKKEL
BY
Carlsen & Hagle
ATTORNEYS

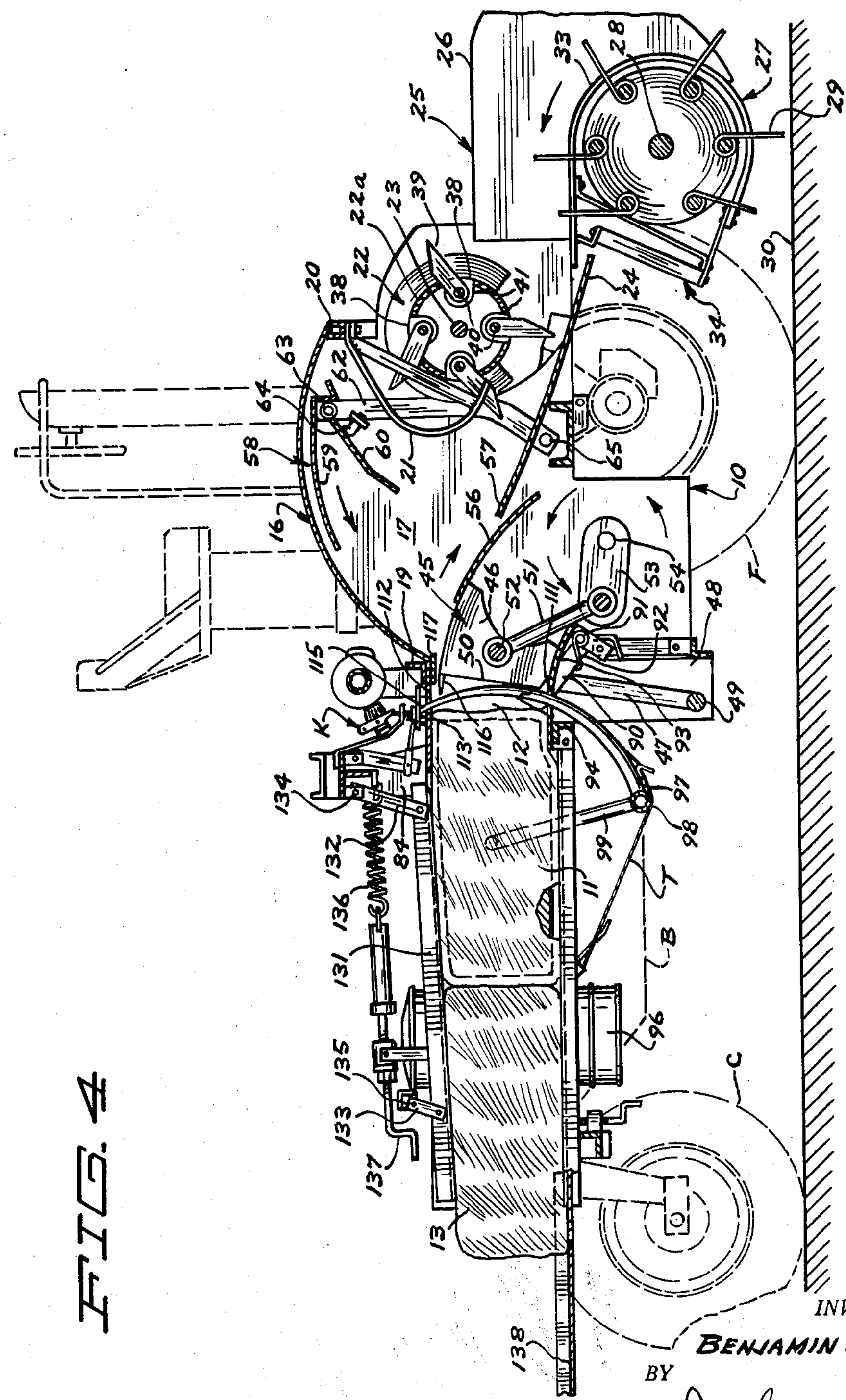
INVENTOR.
BENJAMIN L. NIKKEL
BY
Carlsen + Hagle
ATTORNEYS

Dec. 22, 1959 B. L. NIKKEL 2,917,993
BALER
Filed May 18, 1954 5 Sheets-Sheet 4
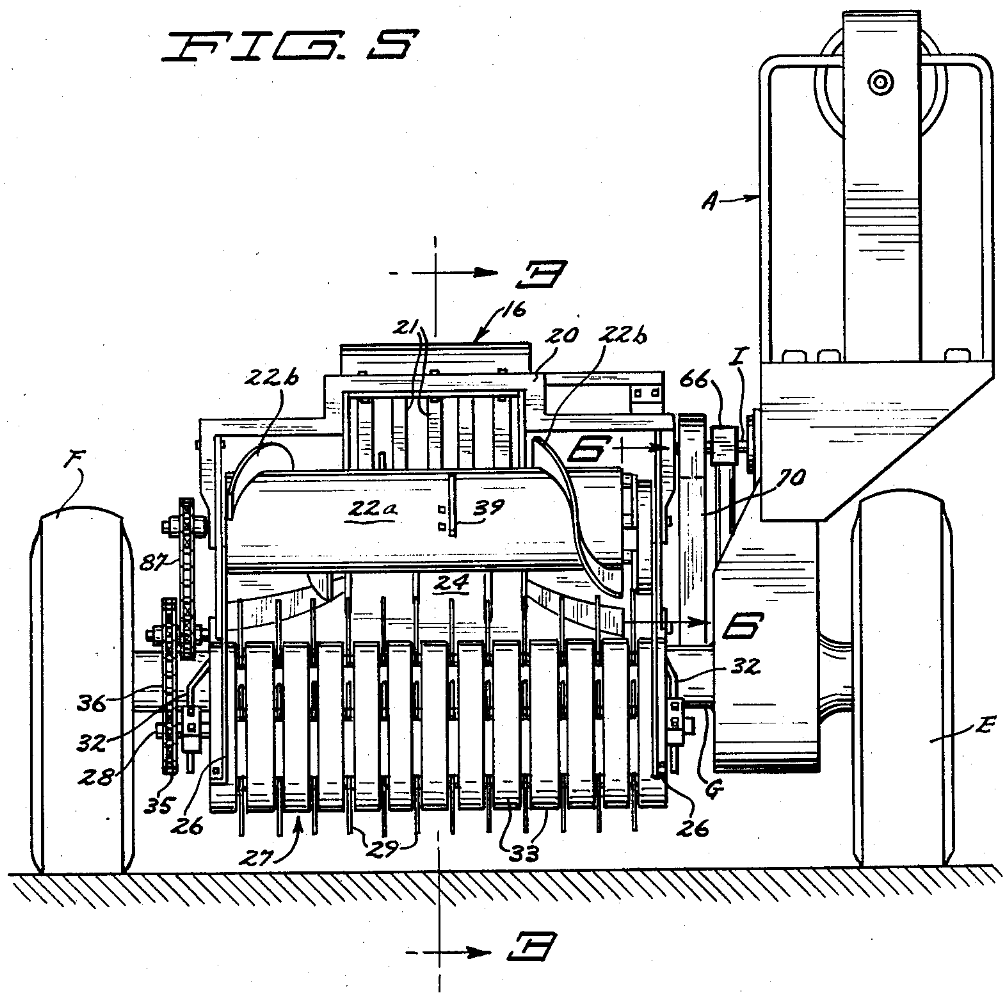
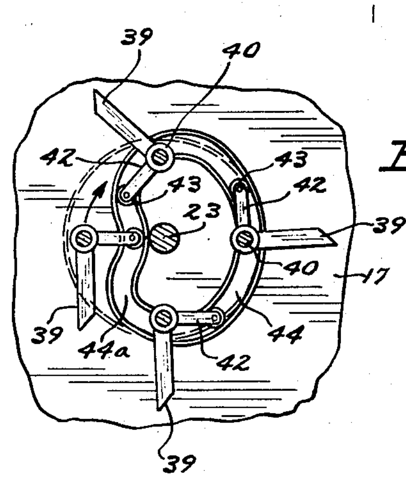
FIG. 6
INVENTOR.
BENJAMIN L. NIKKEL
BY
Carlsen & Hagle
ATTORNEYS Dec. 22, 1959 B. L. NIKKEL 2,917,993
BALER
Filed May 18, 1954 5 Sheets-Sheet 5
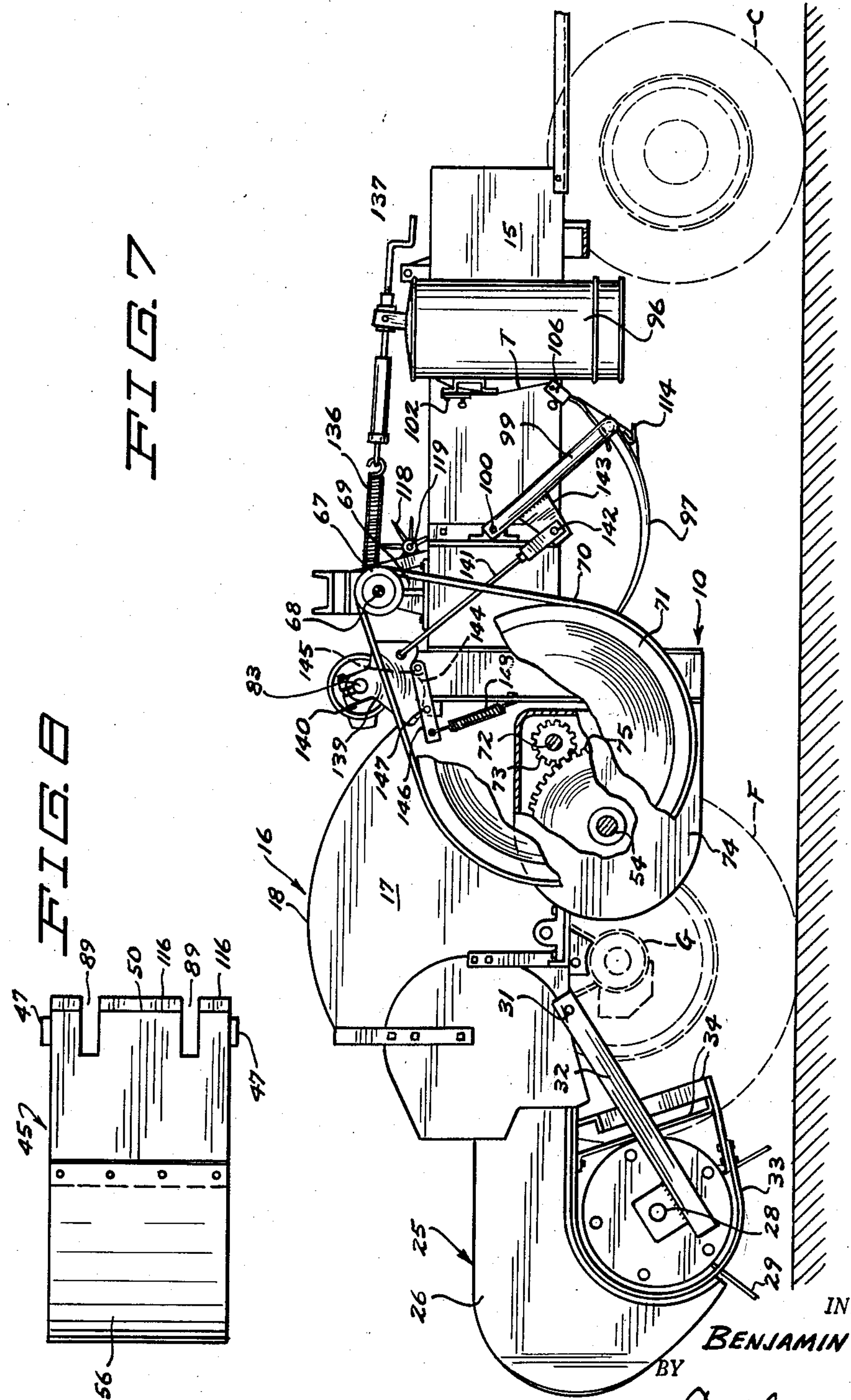
INVENTOR.
BENJAMIN L. NIKKEL
BY
Carlsen & Hagle
ATTORNEYS United States Patent Office 2,917,993

Patented Dec. 22, 1959

2,917,993

BALER

Benjamin L. Nikkel, Windom, Kans.

Application May 18, 1954, Serial No. 430,619

2 Claims. (Cl. 100—142)

This invention relates generally to improvements in balers of the type used for accumulating and compressing fibrous materials into rectangular bales and then tying such bales, in order to retain them in shape for stacking or transporting the materials. Such machines are primarily used upon the farm for baling hay, straw and the like and, as a matter of convenience, the material being baled will be hereinafter generally referred to simply as hay.

There are, of course, many machines of this general type and in most instances they are characterized in that there is provided an elongated baling chamber in which there is mounted for reciprocation a baling plunger and with provision for feeding the hay to be baled into the chamber in advance of the plunger from the top or the side of the baler. In the earlier machines the tying is accomplished by one or more operators, but in late years various provisions have been made for automatically tying the bales, usually utilizing a supply of the tying material (whether it be wire or twine) in conjunction with a tying mechanism and needles which project the tying material across the baling chamber and, after a bale has been formed, again return the tying material across the chamber so that the bales are properly encompassed and tied. There are various disadvantages, however, in such machines, one of which lies in the difficulty of feeding the hay into the top or side of the baling chamber and it is the primary object of my invention to provide what may be referred to as a straight-through type of baler in which the hay is fed directly into one end of the baling chamber instead of into the top or side thereof. Further in accordance with this object of the invention I provide an oscillatable baling plunger arranged to travel an arcuate path into and out of the receiving end of the baling chamber and supported about an axis spaced clear of the path of the hay to be baled, in conjunction with a packer element also oscillatable in an arcuate path and the purpose of which is to thrust the hay in folds into the open end of the baling chamber each time the baling plunger is withdrawn therefrom.

Another object of my invention is to provide a baler of this general type which is comparatively compact, light and inexpensive by contrast with the more ordinary type of balers in which the baling plunger reciprocates, and in furtherance of which object I provide for tying the bales with baling twine properly disposed through the chamber by arcuately swinging needles which cooperate with ordinary knotting mechanisms.

Still another object of my invention is to provide a baler of this kind into which the hay to be baled may be readily fed into the chamber by the use of an ordinary rotary pick-up which will elevate the material from the field surface and which operates then in conjunction with a rotary feeder having projecting teeth operated by an eccentric mechanism to lay back in a trailing position as the material is delivered into the path of the aforesaid packer element, thus to obtain the maximum of simplicity in the feed mechanism throughout and to contribute to the straight, through characteristics of the baler as a whole by virtue of which it will operate without any tendency to become clogged or plugged by the hay, as well as contributing to the overall compactness of the machine.

These and other more detailed and specific objects will be disclosed in the course of the following specification, reference being had to the accompanying drawings, in which—

Fig. 1 is a side elevation of a baler according to my invention, the same being shown as supported upon a particular kind of tractor, later to be identified, and which tractor is shown only partially and primarily in dotted lines.

Fig. 2 is an enlarged fragmentary detail section showing a part of the tensioning means for the twine used in tying the bales.

Fig. 3 is a longitudinal vertical section through the machine along the lines indicated at 3—3 in Fig. 5 and showing in full lines the positions assumed by the baling plunger and packer element at the end of the working or compression stroke of the former, and also showing in dotted lines the opposite of this condition with the plunger retracted or withdrawn and the packer element at the extremity of its working stroke toward the baling chamber.

Fig. 4 is a similar view of the machine but showing the needles at the end of their working stroke, at which point the bale just completed is being tied with the twine.

Fig. 5 is a front elevation of the machine, in this case showing the tractor also in full lines.

Fig. 6 is an enlarged vertical sectional detail view taken substantially along the line 6—6 in Fig. 5 and showing the cam or track which lays the fingers of the feeder drum back into trailing positions as they free the material for entrance into the baling chamber, and to further make clear the operation also showing the fingers operated by said track.

Fig. 7 is an elevational view of the machine taken from the side opposite that of Fig. 1, showing the tractor wheels in dotted outlines and with portions of the housing broken away to disclose the drive mechanism.

Fig. 8 is a top plan view of the baling plunger alone.

My improved hay baler as disclosed herein is intended for support upon and operation in conjunction with the particular type of tractor which is set forth in detail in the Martin Ronning Patent No. 2,524,083, and the baler is further mounted upon the tractor in the manner set forth for the implements disclosed in that Ronning patent as well as the Ronning and Korsmo Patent No. 2,641,887. Thus my invention as here disclosed is not self-supporting, that is it does not have its own transport wheels, but I do not, of course, limit myself to this particular arrangement of the machine.

Reference is invited to the prior patents identified for complete details of the tractor construction, as well as the manner in which various implements, including my baler, may be mounted thereupon, and in the present disclosure the tractor is designated generally at A and is seen to be characterized in that it has an elongated laterally disposed and longitudinally extending chassis B whereupon is mounted the usual engine, transmission, operator's station and other parts (not shown herein) going to make up a self-propelled tractor unit. At the rear this chassis B is supported upon a dirigible rear wheel C and forwardly there is provided a transversely extending power driven axle D at the extremities of which are larger traction wheels E and F. The traction wheel E and rear dirigible wheel C are located substantially in tracking alignment, whereas the other wheel F is spaced laterally a considerable distance from the plane of the chassis B. There is thus an unobstructed space alongside the chassis B and located over the axle D for the accommodation of the implement to be carried by the tractor and for mounting the implement the axle D is provided with a non-rotating axle housing G having upwardly flaring sockets H for the reception of corresponding, downwardly tapering mounting elements on the implement (not here shown) so as to provide two point support at the front of the tractor. In addition, the rear of the implement is suitably affixed to the side of the chassis B near its rear end completing a three point support for the implement, all as clearly set forth in the Ronning and Ronning and Korsmo patents previously referred to herein. The engine which powers the tractor is also provided with a power take-off shaft (which appears at I in Fig. 5) on the inner side of the chassis unit so that convenient connection may be made to the implement mounted upon the tractor.

Turning now to a description of the baler which constitutes the present invention, the same comprises a main frame designated generally at 10, the rear portion of which consists of a baling chamber 11 of rectangular cross section and open at both its front and rear ends 12 and 13. As is common in such constructions the baling chamber is made up of corner angle irons, designated throughout at 14, extending between which are metal sheets, indicated throughout at 15, so as to provide an elongated receptacle to receive the material to be baled and with such chamber, of course, considerably longer than each bale to be formed therein. The open front end 12 of the baling chamber opens into a feed housing 16 made up of suitably braced and reinforced sheet metal having sides 17 and a hoodlike top 18 with the rear end of the latter secured to a transversely extending cross angle 19. Forwardly the top 18 of the feed housing terminates in the cross channel 20 from which there hangs a plurality of rearwardly and then forwardly curved stripper bars 21 and below this channel 20 there is mounted a rotary feeder 22 including a drum 22*a* mounted for rotation with a transversely extending shaft 23. Below the said feeder 22 there is a curved, upwardly and rearwardly extending bottom sheet 24 constituting a bottom closure for the feeder housing 16 and forwardly of this assembly there is a transversely widened gathering housing, designated generally at 25 including side sheets 26 between which there is mounted a conventional type of pick-up unit 27. Said pick-up unit rotates with a transversely extending shaft 28 and has a series of spring wire teeth 29 operating in proximity to the field surface 30 to pick up hay or other crop material therefrom and carry the same upward and rearwardly into engagement with the teeth of the feeder 22, as will presently appear.

The gathering housing 25, including the wings or side sheets 26 thereof and the pick-up unit 27, is mounted for up and down adjustment about horizontal transverse pivot axes as provided by stub shafts 31 in the sides of the feeder housing 18 and for this purpose side arms 32 extend rearwardly from the housing or pick-up assembly for mounting upon said pivots. In addition to the shaft 28 which rotates the pick-up unit 27 the same also, as customary, includes wide stripper bands 33 partially surrounding the unit and tied together by suitable bracing 34 so that upon counter-clockwise rotation, as seen in Fig. 4, the fingers 29 will pick up hay from the field and will force it rearwardly over the bottom sheet 24 into engagement with the rotary feeder 22. This pick-up unit is entirely conventional in its construction and operation and as will be noted in Fig. 1 the same is driven by the provision on one end of the shaft 28 of a sprocket 35 which operates a sprocket chain 36 driven by a sprocket 37 upon one of the stub shafts 31, as will presently appear.

The rotary feeder 22 is also largely conventional in its construction and operation having its cylindrical drum 22*a* provided with a series of openings 38 adjacent its central portion through which there projects feeder teeth 39. The drum 22*a* is of the same length, about, as the pick-up unit 27 but has teeth 39 only on its center portion, there being oppositely angled and inwardly feeding auger flights 22*b* outwardly of the teeth, as seen in Fig. 5. The said teeth are mounted upon actuating shafts 40 which are journaled lengthwise of the inside of the drum 22*a* in suitable bearings 41 and at one end of this feeder the said actuating shafts 40 are provided with short cranks 42 at the ends of which are journaled rollers 43 traveling an irregularly shaped camway 44 which is fastened within the adjacent side sheet or panel 17 of the feeder housing, as best shown in Fig. 6. The shape of this camway 44 is such that the teeth 39 will be held in substantially radial positions with reference to the axis of the shaft 23 until, during rotation of the drum 22*a*, these teeth reach the rear part of the feeder as a whole. At such time the forwardly offset portion 44*a* of the camway will fold the teeth 39 back against the drum in a trailing position so that the teeth will clear themselves of hay or crop material. In addition, the aforesaid stripper bars 21 assist in this function and, in conjunction with the folding of the teeth back to their trailing positions, prevent any carry-over of the hay by the rotary feeder back toward the front of the machine as will be readily appreciated. It will be noted that the teeth 39 are not projected from or retracted into the drum but the action is purely one of swinging or folding the teeth back toward trailing positions so that they will clear themselves of the hay at the proper time.

The functioning of the aforesaid pick-up unit 27 and rotary feeder 22 will cause the hay to be delivered rearwardly along the bottom sheet 24 of the feeder housing toward the open frontal end 12 of the baling chamber 11 and the hay is forced into the chamber and compressed by means of an oscillating or swinging baling plunger, designated generally at 45. The head 46 of this plunger is secured between the upper ends of oscillating carrier bars 47 which depend into the lower part 48 of the housing or main frame 10 and which are joined to operate in unison by a transverse rock shaft 49 suitably journaled in bearings in the sides of the frame. The baling plunger 45 is thus forced to swing in an arcuate path centered about the axis of this rock shaft 49 and the parts are so arranged and proportioned that on the working stroke the rectangular rear end face 50 of the plunger will be swung rearwardly into the open end 12 of the baling chamber and will substantially fill the chamber both vertically and horizontally in order to compress the hay in a rearward direction. On the other hand, when the baling plunger 45 is swung downwardly and forwardly on its return stroke to the position indicated in dotted lines in Fig. 3, its head 46 will clear the path of hay moving rearwardly off the bottom sheet 24 and toward the baling chamber so that the very desirable straight-through type of feed may be obtained. For thus oscillating or swinging the baling plunger 45 there is provided a connecting rod 51 journaled at 52 on a transverse axis to the head 46 of the plunger and at the other end journaled between the arms 53 of a crank shaft 54. Said arms 53 are, of course, spaced transversely of the machine and the oppositely extending ends of the crankshaft 54 are journaled out through the sides 18 of the machine. In addition the baling plunger 45 has a forwardly and downwardly curving deflector plate or wing 56 so that during the working stroke of the plunger rearward into the baling chamber this deflector plate will pass closely beneath the rear end 57 of the bottom sheet 24 and prevent hay from falling down into the crankshaft well and out of the machine. This is clearly evident from both Figs. 3 and 4.

Completing the elements of the machine which feed and compress the hay into the baling chamber 11 is a packer element, designated generally at 58, comprising diverging upper and lower wings 59 and 60 of sheet material which are carried at the ends of side arms 62 and normally are positioned immediately below the hoodlike top 16 of the feeder housing. The wing 59 is secured atop the arm 62 while the lower wing 60 is pivoted at 63 between the arms and normally hangs, or is expanded as it feeds the hay, against bumpers of resilient material designated at 64 carried by the arms. The arms 62 extend downwardly and are then curved rearwardly at their lower ends whereat they are pivoted at 65 to stub shafts journaled outwardly through the sides of the feeder housing, thus mounting the arms for oscillation in a vertical and longitudinal plane. In the operation of the machine as will be later described in detail, this packer element 58 will swing rearwardly and downwardly behind the baling plunger 45 as the latter travels its return stroke downwardly and forwardly and the diverging wings 59—60 of the packer element will then force and fold charges of the hay into position for compression into the open end 12 of the baling chamber 11 upon each successive rearward working movement of the baling plunger. This position of the packer element 58 and its relationship to the baling plunger 45 when the same has been withdrawn downward and forward is shown in the dotted lines in Fig. 3.

The crank shaft 54 is driven off the power take-off shaft I of the tractor through a coupling, appearing only at 66 in Fig. 5, which connects said power take-off to a drive pulley 67 appearing in Fig. 7 of the drawings. This pulley 67 is mounted upon a stub shaft 68 carried by a bearing 69 secured atop the baling chamber 11 to the rear of the feeder housing 16 and a belt 70 connects this pulley 67 to a much larger combination pulley and flywheel 71, all of these components, of course, being located on the side of the baler adjacent the tractor A. This combination pulley and flywheel 71 is mounted upon a shaft 72 driving a gear 73 in a transmission housing 74 with said gear meshing with a larger gear 75 secured to the adjacent end of the crankshaft 54, as also shown in Fig. 7. On the opposite side of the machine, remote from the tractor, the crankshaft drives a sprocket 76 upon which is secured an eccentric lever 77 for the operation of a pitman 78 pivoted at 79 to a lever arm 20 secured to one of the stub shafts 65 operating the packer unit 58. It is obvious then that the continuous rotation of the crankshaft 54 from the tractor engine will not only operate to oscillate the baling plunger 45 but will also, through the pitman 78, oscillate the packer element 58 in the required prescribed timed relationship to the movements of the plunger. Also operated by the sprocket 76 upon the crankshaft is a sprocket chain 81 which drives the loose sprocket portion 82 of a tying and needle clutch which is journaled for rotation upon the transversely extending tying shaft 83 carried in suitable bearings 84 atop the baling chamber just rearwardly of the feeder housing 16. The chain 81 operates over a sprocket 85 upon an idler shaft 86 and this sprocket in turn operates another sprocket chain 87 trained over the aforesaid sprocket 37 to operate the pick-up unit 27 and also running over a sprocket 88 upon the shaft 23 of the rotary feeder 22. As is customary in machines of this kind the three sprocket chains just described are so related with the various sprockets and operated about idler sprockets that the elements to be driven are rotated in the proper direction, as will be clearly understood from an inspection of the drawings without further description at this point.

As best seen in Fig. 8 the working face 50 of the baling plunger 55 is provided with spaced apart and vertical slots 89 which open at their upper and lower ends and through the rear of the plunger, thus to provide clearance for the operation of the tying needles as will presently appear. Also aligned with these slots 89 is a pair of bale or hay holder fingers 90 pivoted at 91 in the lower part of the housing 10 and normally biased in an upward direction by means of torsional coil springs 92. When the baling plunger 45 is withdrawn from the bale chamber these hay holders 90 are swung upwardly by the said springs 92 in order to hold the hay in place and then as the plunger re-enters the baling chamber with the next charge of hay, the lower corners of the slots 89 cam the hay holders down out of the way, as will be readily understood. It will also be noted in Figs. 3 and 4 that there is a forwardly and downwardly extending arcuate apron 93 secured to a main cross member 94 of the frame 10 and projecting forwardly from the open end 12 of the baling chamber. Said apron 93 thus forms a continuation of the bottom of the baling chamber but one which is curved so that the baling plunger 45 will travel smoothly over it as the plunger oscillates and so that no hay will escape from the bottom of the machine at this point.

The bales accumulated in the baling chamber 11 are tied by two lengths of encompassing twine from ordinary balls of twine, one of which appears at 95, and which balls are conventionally disposed in twine holders 96 located upon the opposite sides and toward the rear of the baling chamber. The twine from each twine holder is initially disposed vertically across the forepart of the baling chamber by means of arcuate needles 97, of which there is one at each side of the machine, and such needles are connected to operate in unison by a cross shaft 98 and are furthermore supported by lever arms 99 pivoted at 100 to opposite sides of the baling chamber to operate in unison. The twine from the balls 95 in the twine holders 96, and which is designated at T throughout the drawings, is withdrawn from said holders through an opening 101 (Fig. 2) in the forward sides of the twine holders. From this opening the twine T from each twine holder is led downwardly through a primary twine tensioner 102 which consists of a bracket secured to the twine holder and having a depending lip 103 against which there bears a leaf spring 104, the effective tension of which may be adjusted by means of a set screw 105. The twine must be pulled downwardly between the lip 103 and spring 104 and thus the frictional action of these parts upon the twine will yieldably resist the withdrawal of twine from the twine holders to a point sufficient to prevent overrunning and tangling. In addition there are secondary twine holders 106, one of which is located at each side of the machine and secured to the sides of the baling chamber immediately forward of the twine holders. As is best shown in Fig. 2 each of these twine holders 106 comprises a hollow housing 107 through which the twine T passes in a downward and forward direction and against the lower, rear surface of which housing the twine is pressed by means of an elongated cam lever 108 which is biased downwardly and rearwardly by a leaf spring 109. Here again a set screw 110 provides for adjustment of the effective spring tension against the cam lever 108, but it is most important to note that when the needles 97 are in their normal positions withdrawn from the baling chamber, as shown for example in Fig. 1, the cross shaft 98 connecting these needles will be moved to the rear beneath the curved extremity of the cam levers 108. The shape of the cam levers 108 is such that in this condition of the needles the cross shaft 98 will cam the levers in an upward direction against the tension of the springs 109 so that the twine T may flow through the secondary tensioners 106 without being retarded thereby during the time at which the bale is being formed.

The needles 97 are curved on an arc centered about the axis of the pivots 100 and these parts are so proportioned that when the levers 99 are swung forwardly the needles 97 will be swung upward through the front 12 of the baling chamber 11, as seen in Fig. 4. Obviously for this purpose the apron 93 will be provided with suitable openings 111 to clear the needles as will also the top 112 of the baling chamber, where the openings appear at 113 in Fig. 4. The twine T at each side of the machine after it leaves the secondary tensioners 106 passes loosely through apertured brackets 114 upon the lower rear ends of the needles 97 and the latter are channeled so that the twine will follow around the curvature of the needles to the points 115. Located in the path of these points 115 as they emerge through the openings 113 are entirely conventional twine knotter mechanisms, designated generally at K, mounted upon the upper end 112 of the baling chamber rearwardly of the aforesaid shaft 83 and operated thereby. Since these knotting mechanisms are as stated completely conventional, it is not believed necessary to describe them, either as to their construction or operation, in detail herein. In any event, assuming that the machine is being set up for the formation of the first bale, the initial travel of the needles 97 upwardly through the front of the baling chamber 11 will cause the end of the twine T at each side to be engaged by the knotting mechanisms K and then as the needles return to their starting positions this twine will remain stretched vertically across the front of the chamber, as designated at T' in Fig. 3. Then as the baling plunger 45 is set in operation the successive charges of hay fed into position by the packer element 58 will be forced rearwardly into the baling chamber 11 and lengths of twine will be withdrawn from the balls 95 until they assume U-shaped conditions at each side of the accumulated bale, encompassing the end and upper sides of the bale. It might here be noted that the charges of hay fed into position for compression into the baling chamber are severed, as is usual, by the coaction of knives 116 and 117 which are located respectively on the upper edge of the baling plunger 45 and upon the lower edge of the top plate 112. These knives coact in shearing relation to sever one hay charge from the next, but as seen in Fig. 8 the knife 116 is interrupted in the plane of the slots 89 so that the twine will not be cut.

As is customary in these automatic hay balers the length of the bales is controlled by the operation of what is commonly referred to as a star wheel or spike wheel, here designated at 118, and which is carried upon a transverse shaft 119 so that the points of the wheel will engage the top of the bale being formed. The shaft 119 is located in suitable bearings for this purpose and at one end the shaft carries a cam 120 which swings in a plane inwardly of a trip rod 121 slidably mounted in suitable clips or bearings for fore and aft movement immediately above the baling chamber. At its rear end the trip rod 121 is provided with a roller 122 and normally the trip rod stands in the position shown in Fig. 1, into which position the rod is biased by the forward pull of a retractile coil spring 123 stretched between a point 124 upon the rod and a lug 125 which is located near the upper end of a stop lever 126. The latter is fulcrumed at 127 upon the side of the feeder housing 16 and its upper end is biased in a rearward direction by a coil spring 128 stretched between the lower end of the lever and an adjacent point on the feeder housing side, as seen in Fig. 1. Thus in the normal condition of the parts the upper end of the stop lever 126 is held beneath the forwardly projecting end of a clutch release finger 129 which forms a part of an entirely conventional, one-revolution clutch 130 connected between the sprocket 82 and shaft 83. In this normal condition of the parts the sprocket 82 is declutched from the shaft 83 and turns independently thereof, being driven, of course, by the aforesaid sprocket chain 81 and by the sprocket upon the crankshaft 54.

Rearwardly of the top plate 112 the upper part of the baling chamber 11 consists of a bale tensioning plate 131 which is suspended for longitudinal swinging movements by front and rear links 132 and 133 which are pivoted at their upper ends at 134 and 135, respectively, to suitable bracket members secured atop the baling chamber. The bale tensioning plate 131 is urged in a forward direction by means of a strong retractile coil spring 136, the tension of which is adjustable by means of a hand crank 137 and in the formation of the bales in the baling chamber the bales must exert an upward and rearward force upon this bale tensioning plate such that the adjustment of effective tension of the spring 136 will regulate the density of the bales, as is well known in the art. Such an arrangement also permits a previously completed bale to serve as a support against which each next bale is formed, as shown in Fig. 4, and in the present instance the baling chamber is shown as accommodating two completed bales. Thus as the bales are formed the rearmost bales will be ejected from the rear end 13 of the baling chamber and will drop off of the rear apron 138 onto the field surface.

While it is believed that the operation of the machine as a whole will be readily understood from the foregoing, the same will nevertheless be described from the point at which the needle has placed the twine T' across the front end of the baling chamber as mentioned above. With the tractor engine then driving the various feeding devices the hay will be picked up from the field by the pick-up unit 27 and driven rearwardly over the bottom sheet 24 from the sides of which the hay will be engaged by the auger flights 22*b* for movement toward the center of the machine and engagement by the projecting teeth 39 of the rotary feeder 22. Obviously these teeth will then continuously project the hay rearwardly off the rear end 57 of the bottom sheet 24 and as the teeth are laid back by action of the camway 44 they will clear the hay and the same will be stripped off by the strippers 21. Assuming then that the baling plunger 45 is in the dotted line position of Fig. 3 the packer element 58 will swing downwardly to force a charge of the hay accumulated thusly in the back of the feeder housing 16 toward the open end 12 of the baling chamber. As the packer element 58 rises out of the way the baling plunger 45 will then swing rearwardly until the knives 116—117 sever the charge of hay which will then be thrust into the forward end of the baling chamber. This action continues until the star or spike wheel 118 is turned in a clockwise direction, as viewed in Fig. 1 and by the travel of the bale beneath it, to a position at which the cam 120 has engaged the roller 122 and forced the trip rod 121 in a rearward direction, this action continuing until the point 120*a* of the cam finally clears the roller 122. As this occurs the spring 123 which has been stretched during the rearward travel of the trip rod will snap the rod forwardly causing its forward end to strike the stop lever 126 and drive the same from beneath the end of the clutch actuating finger 129. When this occurs the clutch 130 is automatically engaged and remains so for one complete revolution of the sprocket 82 and during such revolution locks the sprocket to the shaft 83. Upon completion of this one-revolution travel of the shaft 83 the finger 129 again comes in contact with the upper end of the trip lever 126 to disengage the clutch and this is a clutch construction and operation typical in farm equipment of this nature so that no further description should be required herein.

Referring to Fig. 7 it will be seen that the end of the shaft 83, opposite that upon which the clutch 130 is mounted, carries a cam 139 which is clamped at 140 to the shaft to turn therewith. This cam serves also as the driving eccentric for operation of a link 141 which is pivoted at 142 to a bracket 143 upon the lever 99 at that side of the machine, so that this one revolution of the shaft 83, responsive to actuation of the clutch, will swing the needles 97 first upwardly through the baling chamber to complete the disposal of the twine T entirely around the completed bale and hold the ends of the twine in proximity where they are knotted together by the operation of the knotters K, following which the return motion of the needles 97 will leave new vertical spans T' of the twine in position for formation of the next bale. It is furthermore this one-revolution operation of the shaft 83 which operates the knotters K and the shaft is conventionally provided with sector-shaped gears which drive the knotter pinions, as shown in the drawing. In addition to its function as an operator for the needles 97 the cam 139 also has an irregular cam surface 144 which is engaged by a roller 145 upon a lever 146 fulcrumed at 147 on the adjacent side of the frame 10. The lever 146 is biased by a retractile coil spring 148 to force the roller 145 into the low spot of the cam, as seen in Fig. 7, and thus the roller 145 tends to rotate the shaft 83 past what might be regarded as a dead center condition in order to ensure the declutching of the clutch 130 and the restoration of the operator member 129 thereof atop the lever 126.

The actuation of the secondary twine tensioners 106 in accordance with the position of the needles 97 is important in that it frees the twine T of any tension in addition to that imposed by the primary tensioners 102 while the bale is being accumulated. This has been one of the chief difficulties in the operation of automatic twine tying balers for the reason that the hay, as it is forced into the baling chamber, has a pronounced tendency to jerk twine from the supply balls 139 and this has caused frequent breakage of the twine. On the other hand, as the needles move into the baling chamber it is necessary that added tension be applied to the twine so that it will be tightly tied around the bales and this increased tension is provided by the secondary tensioners 106 as the needles free the cam levers 108.

It will be apparent from the foregoing that I have provided a comparatively simple machine in which the hay or other crop material may be fed in a straight-through manner into the baling chamber and that in addition the machine is quite compact and is thus more readily maneuverable as contrasted with the longer and heavier machines using reciprocating bale plungers.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a baler of the character described, a frame having a forwardly opening baling chamber and a forwardly disposed gathering housing opening rearwardly into the open forward end of said chamber, a bottom in said housing, feeding mechanism in said housing for feeding material to be baled rearwardly over said bottom and in a path leading directly into the open forward end of said chamber, said feeding mechanism including a packer element swingable from a position forwardly of and above said open end of the chamber in a rearward and downward direction, means located below the path traveled by the material into the chamber for swingably supporting said packer element, a baling plunger, means also located below said path pivotally and operatively mounting said plunger to swing the same upwardly and rearwardly into the open forward end of the chamber, and said feeding mechanism also including a rotary feeder located in the gathering housing above the bottom thereof and forwardly of said packer element when the same is in its said forward position.

2. A baler for agricultural crop materials, comprising in combination, a frame having a forwardly-rearwardly extending baling chamber open at its forward end, a forwardly disposed gathering housing having an open rear end communicating with the forward end of the baling chamber to direct crop material in a straight path into the baling chamber, said housing having an upwardly arched top and an open forward end, mechanism for feeding crop material in a feed path rearwardly through said housing and into the open forward end of the baling chamber, a packer element pivotally associated with the frame and swingable from a forward elevated position above and clear of said feed path below said upwardly arched top of the housing downwardly and rearwardly through the material moving into the open forward end of the baling chamber, a baling plunger also pivotally associated with the frame and swingable from a forward lowered position below said feed path upwardly and rearwardly through the path of the material entering the chamber following each downward rearward movement of the packer element to compress the crop material rearwardly into the baling chamber, and means for operating the feed mechanism, packer element and baling plunger.

References Cited in the file of this patent

UNITED STATES PATENTS

| | | |
|---|---|---|
| 2,417,309 | Leslie et al. | Mar. 11, 1947 |
| 2,498,319 | Vutz et al. | Feb. 21, 1950 |

FOREIGN PATENTS

| | | |
|---|---|---|
| 712,974 | Germany | Oct. 29, 1941 |
| 713,812 | France | Aug. 24, 1931 |
| 725,417 | Germany | Sept. 21, 1942 |
| 737,011 | France | Sept. 26, 1932 |
| 1,025,741 | France | Jan. 28, 1953 |

UNITED STATES PATENT OFFICE

CERTIFICATE OF CORRECTION

Patent No. 2,917,993 December 22, 1959

Benjamin L. Nikkel

It is hereby certified that error appears in the printed specification of the above numbered patent requiring correction and that the said Letters Patent should read as corrected below.

Column 5, line 45, for "arm 20" read -- arm 80 --; column 10, line 12, after "forwardly of" insert -- and below --.

Signed and sealed this 21st day of June 1960.

(SEAL)
Attest:

KARL H. AXLINE
Attesting Officer

ROBERT C. WATSON
Commissioner of Patents